(12) United States Patent
Unger

(10) Patent No.: US 6,293,184 B1
(45) Date of Patent: Sep. 25, 2001

(54) GAS BEARING AND METHOD OF MAKING A GAS BEARING FOR A FREE PISTON MACHINE

(75) Inventor: Reuven Z-M Unger, Athens, OH (US)

(73) Assignee: Sunpower, Inc., Athens, OH (US)

( * ) Notice: Subject to any disclaimer, the term of this patent is extended or adjusted under 35 U.S.C. 154(b) by 0 days.

(21) Appl. No.: 09/389,173

(22) Filed: Sep. 2, 1999

(51) Int. Cl.⁷ .................................................... F01B 31/10
(52) U.S. Cl. ................................... 92/153; 384/12
(58) Field of Search ............................... 384/12, 7, 8, 9, 384/10, 11; 60/520; 92/153

(56) References Cited

U.S. PATENT DOCUMENTS

| | | |
|---|---|---|
| 3,127,955 * | 4/1964 | Macks ...................................... 92/160 |
| 4,412,418 | 11/1983 | Beale . |
| 4,802,332 | 2/1989 | Beale . |
| 4,888,950 | 12/1989 | Beale . |
| 5,184,643 | 2/1993 | Raymond . |

* cited by examiner

*Primary Examiner*—F. Daniel Lopez
*Assistant Examiner*—Thomas E. Lazo
(74) *Attorney, Agent, or Firm*—Frank H. Foster; Kremblas, Foster, Phillips & Pollick

(57) ABSTRACT

A gas bearing structure including a cylindrical core and a cylindrical sleeve. The core has a radially outwardly facing surface with longitudinal and circumferential grooves formed thereon. The sleeve has a radially inwardly facing surface that sealingly abuts the outer core surface. The inwardly facing sleeve surface bridges over the grooves, defining fluid, preferably gas, flow paths within each groove. The gas flow paths permit gas to flow from the workspace to radial passages formed through the sleeve sidewall, thereby forming a gas bearing.

11 Claims, 5 Drawing Sheets

GAS BEARING AND METHOD OF MAKING A GAS BEARING FOR A FREE PISTON MACHINE

BACKGROUND OF THE INVENTION

1. Field of the Invention

The invention relates generally to free piston machines, and more particularly to a gas bearing apparatus, and a method of making the gas bearing apparatus, for a free piston machine.

2. Description of the Related Art

Pistons in many machines are connected to a rigid, mechanical link, such as a connecting rod connected to a crank shaft. These pistons are confined within predetermined positions, such as end limits. However, many machines are known which use one or more free pistons.

A free piston reciprocates in a cylinder without a mechanical connection. Such free pistons may be driven by an electromagnetic, linear motor and used, for example, as a gas or other fluid compressor or pump Free pistons are also found in free piston Stirling cycle machines, such as free piston Stirling cycle engines, coolers and cryocoolers.

Free pistons sealingly reciprocate in a cylinder formed in a housing, with a very small gap formed between the cylinder wall and the piston wall. The housing typically encloses a work space bounded by one end of the piston and a second space, or back space, bounded by the opposite end of the piston. A working gas, such as helium, fills the workspace, back space and other regions of the machine within the housing.

Because of the close proximity of the piston wall and cylinder wall during operation, the gap formed between the walls must be lubricated to prevent rapid wear. The most effective lubrication has been found to be a thin layer of the working gas forming a gas bearing. Such gas bearings are described in U.S. Pat. Nos. 4,412,418, 4,802,332 and 4,888,950, all to Beale.

In order to lubricate the piston, gas must be directed into the gap at three or more points around the circumference of the piston after being routed from the workspace or back space. However, transporting and releasing the gas into the gap requires a complex network of passages and ports. Such passages and ports are not easily formed, because the parts into which gas-transporting structures must be formed are small, delicate and made to close tolerance.

It is known to form a shrink fit annular valve sleeve assembly as described in U.S. Pat. No. 5,184,643 to Raymond. Such assemblies will not work for the purpose of forming a gas bearing on a free piston machine due to a lack of control over gas pressures, and a lack of passages for directing the gas against a cylinder wall.

Therefore, the need exists for a gas bearing structure, and a method of making the same, for a free piston machine.

BRIEF SUMMARY OF THE INVENTION

The invention is an improved free piston machine having a gas bearing. In a preferred embodiment, an improved piston includes two parts: an inner, cylindrical core and an outer, cylindrical sleeve. The inner core has a radially outwardly facing surface that abuts a radially inwardly facing surface of the outer sleeve when the core is positioned within a passage formed in the sleeve. A circumferential reservoir groove preferably extends around the core, and a passage with a one-way valve permits fluid to flow into the reservoir. A longitudinal groove extends from the reservoir to at least one, and preferably four circumferential, fluid metering grooves formed in the radially outwardly facing surface of the core. The fluid metering grooves thereby form fluid passages when the inwardly facing surface of the sleeve bridges over and covers the groove. At least three radial passages are formed through the sidewall of the sleeve in fluid communication with the groove to direct fluid in the groove into the gap at the sidewall.

When the improved piston is reciprocating in the cylinder, gas flows from the momentarily higher pressure work space into the reservoir, through the longitudinal groove, through the fluid metering grooves and into the radial sleeve passages that empty the gas into the gap between the piston and the cylinder. This forms a gas bearing that reduces wear on the facing piston and cylinder walls. Such a structure is formed by fitting the core into the sleeve after forming the groove on the outer surface of the core.

In a preferred embodiment, a gas bearing is also formed between a displacer rod and a core passage through which the displacer rod extends. A displacer rod extends through a cylindrical passage through the core, and at least three radial passages are formed through the core's sidewall. The radial passages are in fluid communication with the fluid metering groove, causing gas to flow from the metering groove through the radial passages and into a gap between a radially inwardly facing surface on the core and an exterior displacer rod surface.

In a preferred method of making the piston, the sleeve is heated to expand it, and the core is aligned coaxially with the cylindrical passage. The core is pushed into place within the sleeve's passage, and the two parts equalize in temperature. A very tight seal is formed between the outwardly facing surface of the core and the inwardly facing surface of the sleeve, preventing fluid from passing therethrough except where grooves are formed.

Figure 1:
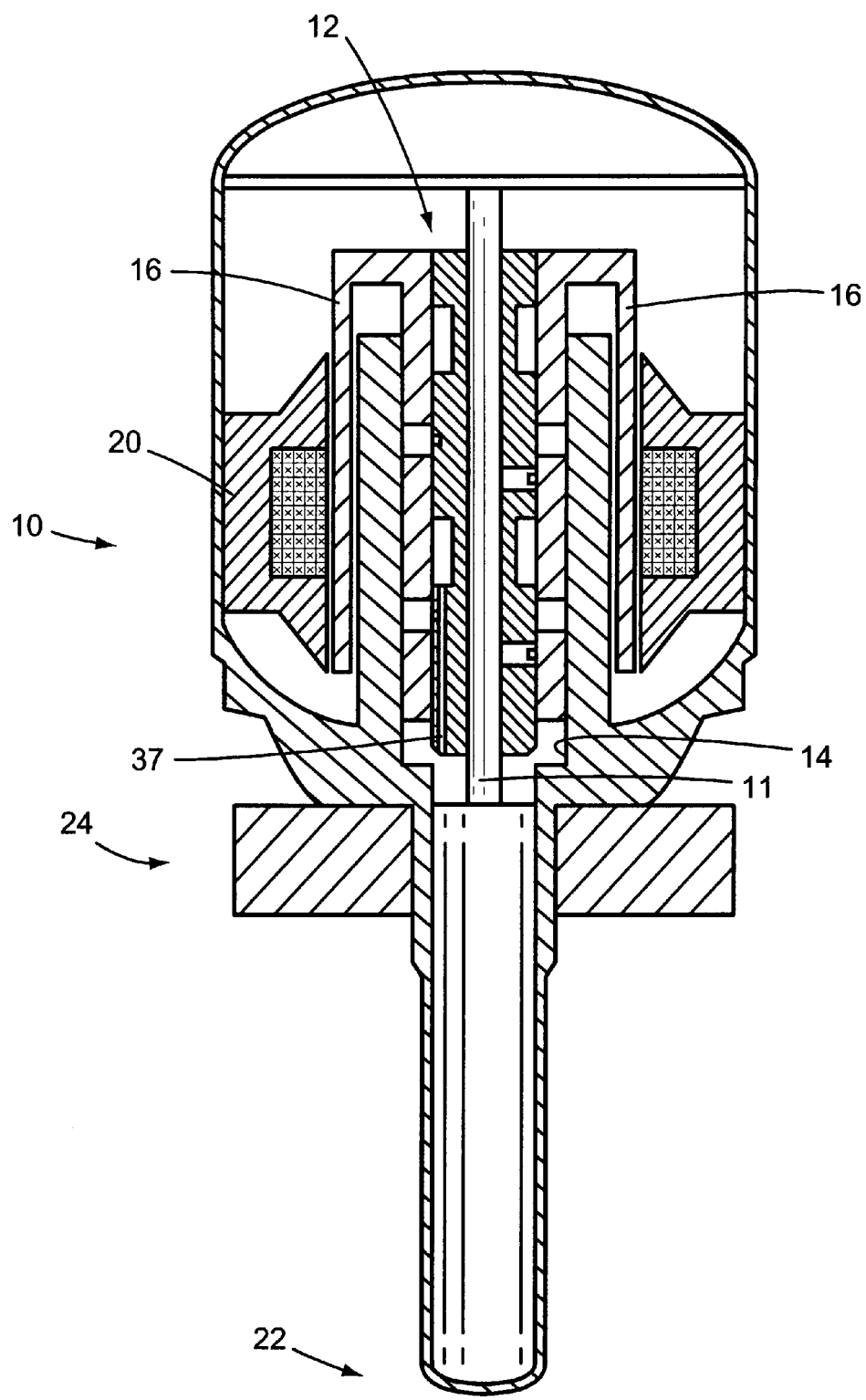
FIG. 1 is a side view in section illustrating the preferred embodiment of the present invention shown in its operable position in a free piston Stirling cycle cryocooler.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION OF THE INVENTION

The preferred embodiment of the present invention is shown in FIG. 1 in a free piston Stirling cycle cryocooler 10. However, as will become apparent to one of ordinary skill in the art from the description below, the invention can be used on any free piston machine.

The piston 12 is slidably mounted within the cylinder 14, and is drivingly linked to an annular ring 16 to which magnets are mounted. The annular ring 16 is disposed within a gap in which a time-changing, alternating magnetic field is generated, causing the annular ring 16, and therefore the drivingly linked piston 12, to be driven in a reciprocating motion. The cryocooler 10 pumps heat from the cold end 22 to the warmer end 24 according to a known thermodynamic cycle, permitting the cryocooler 10 to cool, for example, gaseous oxygen to condense and liquefy the oxygen.

Figure 3:
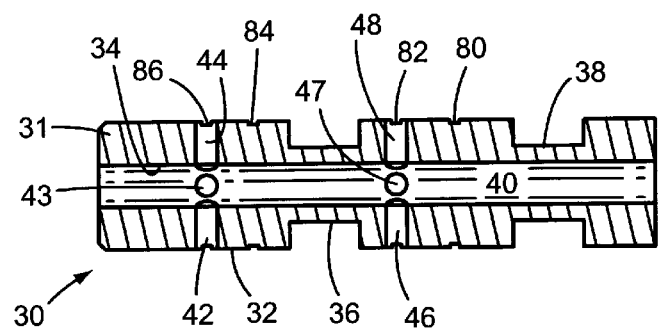
FIG. 3 is a side view in section illustrating the preferred core of the piston.
Figure 4:
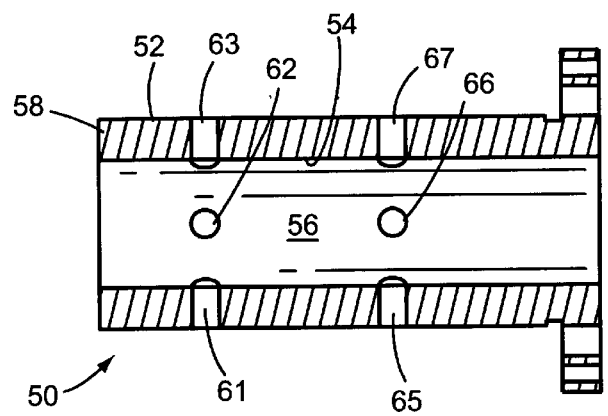
FIG. 4 is a side view in section illustrating the preferred sleeve of the piston.

For the purposes of the present invention, only the piston 12, and its cooperating parts, need to be described. The piston 12 is shown in greater detail in FIG. 2 including two main parts: a core 30 and a sleeve 50. The core 30 and the sleeve 50 are locked together in an interference fit by abutment of their facing surfaces. The core 30 is shown alone in FIG. 3, and the sleeve 50 is shown alone in FIG. 4.

The core 30 is an elongated cylindrical body, preferably made of aluminum, having a radially outwardly facing surface 32 and a radially inwardly facing surface 34 defining a cylindrical passage 40. First and second circumferential reservoir grooves 36 and 38 are formed in the outer surface of the core 30. The radial core passages 42–49 (the passages 45 and 49 are only visible in FIG. 6) are formed at angularly spaced locations around the circumference of the core 30 at approximately 90 degree intervals, and extend through the core sidewall 31 from the inwardly facing surface 34 to the outwardly facing surface 32.

The sleeve 50 is an elongated cylindrical body, preferably made of aluminum, having a radially outwardly facing surface 52 and a radially inwardly facing surface 54 defining a cylindrical passage 56. The radial sleeve passages 61–68 (the passages 64 and 68 are not visible in FIG. 4) are formed at angularly spaced locations around the circumference of the sleeve 50 at approximately 90 degree intervals, and extend through the sleeve sidewall 58 between the inwardly facing surface 54 and the outwardly facing surface 52.

Figure 5:
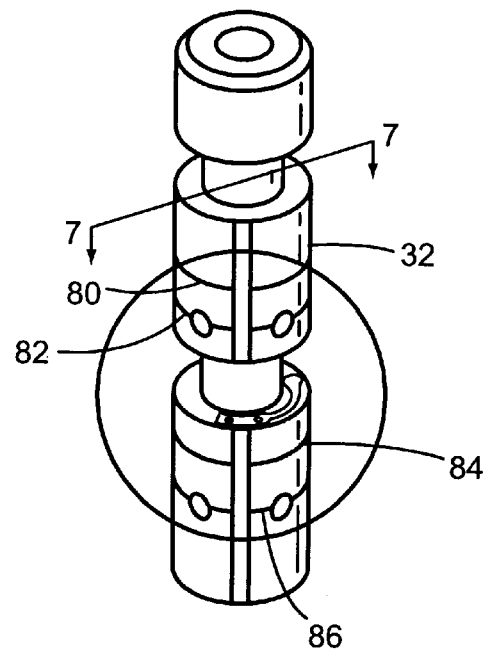
FIG. 5 is a view in perspective illustrating the preferred core of the piston.
Figure 6:
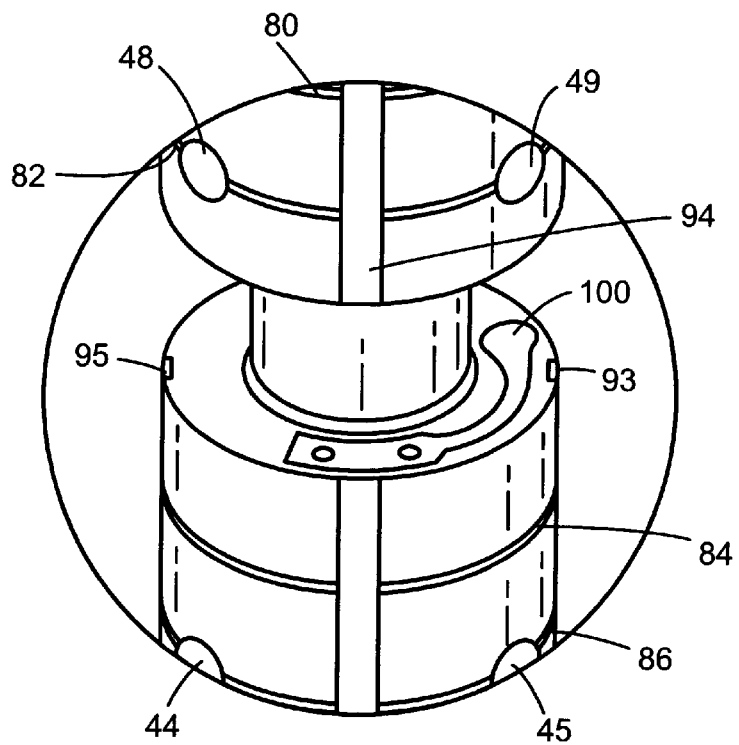
FIG. 6 is a view in perspective illustrating an enlarged section of the preferred core of the piston.

The core 30 is shown in FIGS. 5 and 6 having four circumferential fluid metering grooves 80, 82, 84 and 86 formed in its outwardly facing surface 32. Each of the metering grooves is approximately 0.025 mm deep and approximately 0.178 mm wide. Of course, these dimensions could be changed with resultant changes in the pressure drop of fluid flowing through them.

The metering groove 82 extends around the core 30 and is in fluid communication with the radial core passages 42, 43, 44 and 45. The metering groove 86 extends around the core 30 and is in fluid communication with the radial core passages 46, 47, 48 and 49. The metering grooves 80 and 84 extend around the core 30 and are in fluid communication with the radial sleeve passages 61–64 and 65–68 when the core 30 is positioned within the sleeve 50.

Figure 2:
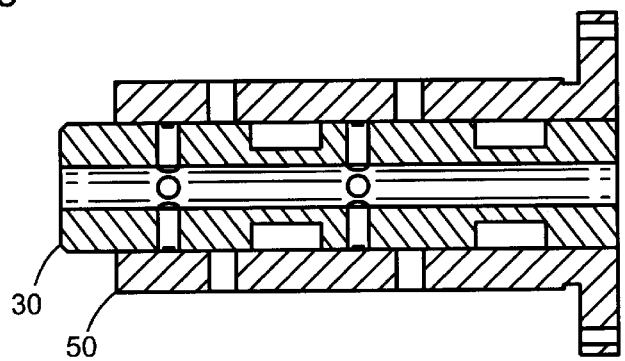
FIG. 2 is a side view in section illustrating the preferred piston.

As shown in FIG. 2, the outwardly facing surface 32 of the core 30 is sealingly abutted against the inwardly facing surface 54 of the sleeve 50. The circumferential metering grooves 80–86 are covered by the portions of the inwardly facing surface 54 that bridge over the metering grooves 80–86. Therefore, the walls of the metering grooves 80–86 and the portions of the inwardly facing surface 54 that cover the metering grooves 80–86 form circumferential fluid flow paths. The preferred fluid that is used in free piston Stirling cryocoolers is a gas, such as helium, and therefore the metering grooves 80–86 in the preferred embodiment are gas flow paths.

The gas flow paths formed by the metering grooves 80–86 of the preferred dimensions have a predetermined resistance to the flow of gas through them that causes a known pressure drop in the gas as it flows from a source, through the metering grooves 80–86 and into the radial core passages 42–49 and radial sleeve passages 61–68. Gas flowing from the radial sleeve passages 61–68 enters the gap between the piston wall and cylinder wall at a predetermined rate to form a gas bearing therein. Gas flowing from the radial core passages 42–49 enters a gap between the displacer rod 11 and the cylindrical passage 40 within the core 30 at a predetermined rate to form a gas bearing therein.

As is known, the resistance to gas flowing into the gap between the piston and cylinder is dependent upon the position of the piston wall relative to the cylinder wall. If the piston wall is close, the resistance increases, thereby increasing the pressure and forcing the piston away from the cylinder wall at that part of the gap. In this respect, the pressure in the radial passages is dependent upon the gap size.

Figure 7:
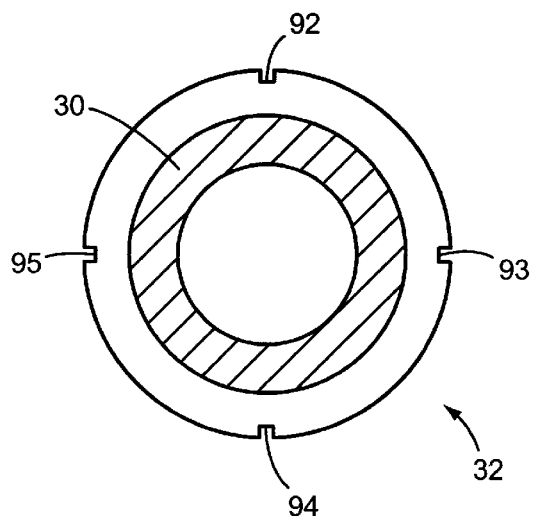
FIG. 7 is an end view in section through the line 7—7 of FIG. 5.
Figure 8:
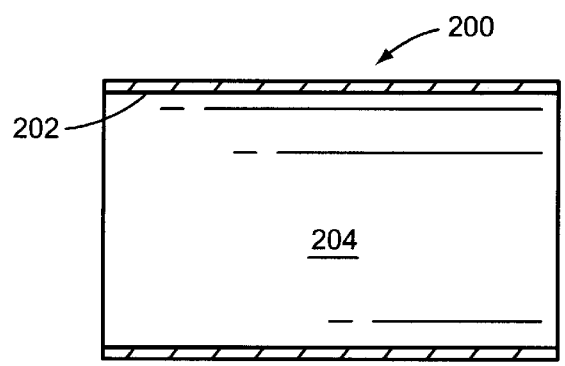
FIG. 8 is a side view in section illustrating an alternative embodiment of the present invention.
Figure 9:
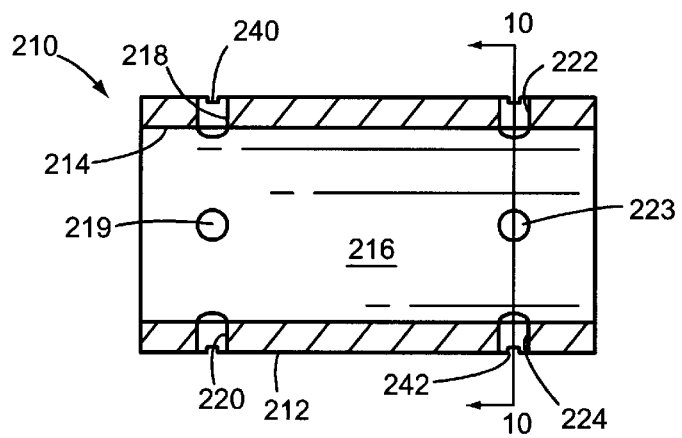
FIG. 9 is a side view in section illustrating an alternative embodiment of the present invention.
Figure 10:
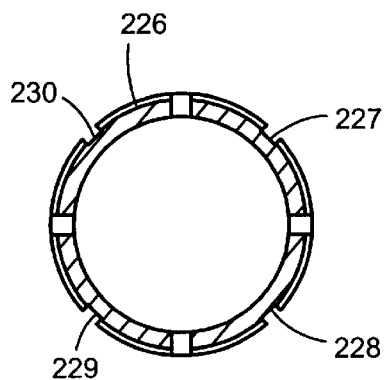
FIG. 10 is an end view in section illustrating the core of FIG. 9 through the line 10—10.

Referring to FIGS. 6 and 7, the longitudinal manifold grooves 92, 93, 94 and 95 are formed in the radially outwardly facing surface 32 of the core 30. These longitudinal grooves preferably connect the first and second reservoirs 36 and 38 without pressure drop for the flow rate involved, and preferably extend at least from the circumferential metering groove 86 to the leftward end of the second reservoir 38 shown in FIG. 3.

The longitudinal grooves 92–95 form gas passages when the inwardly facing surface of the sleeve 50 sealingly abuts the outwardly facing surface of the core 30 and bridges over them, similarly to the circumferential metering grooves 80–86. Each of the longitudinal grooves is in fluid communication with all of the circumferential metering grooves 80–86, and thereby permit gas to flow from the reservoirs 36 and 38 longitudinally to each of the circumferential metering grooves. Because there are four longitudinal grooves, gas flows to four evenly spaced positions on each of the circumferential metering grooves.

A source passage 37, shown in FIG. 1 and having no substantial resistance to the flow of gas, extends longitudinally from the workspace end of the core 30 to the first reservoir 36. A one-way valve, preferably the check valve 100 shown in FIG. 6, permits the flow of gas only into the reservoir 36 from the workspace, and prevents the flow of gas through the source passage 37 in the opposite direction toward the workspace.

The embodiment shown in FIGS. 1–7 operates to form a gas bearing in the gap between the outwardly facing surface 52 of the sleeve 50 and the cylinder wall 14 and in the gap between the inwardly facing surface of the core 30 and the displacer rod 11. When the working gas in the workspace is at a higher pressure than the gas in the first reservoir 36, the check valve 100 opens and gas flows into the first reservoir 36. A spike in pressure during the Stirling cycle causes gas to flow into the first reservoir 36, keeping it at a high pressure during operation of the cryocooler 10.

The gas in the reservoir 36 flows through the longitudinal manifold grooves 92–95 to four spaced positions on each of the circumferential metering grooves 80–86 and the second reservoir 38. The gas supplied by the longitudinal manifold grooves 92–95 flows through the circumferential metering grooves at a predetermined rate and pressure to the radial core passages 42–49 and the radial sleeve passages 61–68. The radial core passages 42–49 direct gas into the gap between the core and displacer rod to form a gas bearing there. The radial sleeve passages 61–68 direct gas into the gap between the sleeve and cylinder wall to form a gas bearing there.

The circumferential metering grooves need to bleed the gas to the radial core and sleeve passages rapidly enough that the gas lubricates the gap between the moving surfaces, but not so rapidly that there is a leakage loss that harms cryocooler efficiency. It has been found that circumferential passages of the size described above provide the needed balance of lubrication without substantial efficiency loss.

When formed initially, the outer surface of the core 30 is slightly larger than the cylindrical passage 56 of the sleeve 50. In the preferred embodiment, there is an approximately 20 micron difference between the outer diameter of the core 30 and the inner diameter of the sleeve 50. Therefore, in order to position the core in the sleeve, the sleeve is preferably heated to approximately 200 degrees Celsius, the sleeve and core are aligned coaxially and then the core is pushed into the cylindrical passage 56 of the sleeve to the position shown in FIG. 2. After the temperatures of the core and sleeve equilibrate, there is an interference fit, resisting any relative movement of the parts.

As an alternative or additional method, the core 30 could be cooled, or as a still further alternative the sleeve could be heated and the core cooled. Greater or lesser diameter differences could, of course, be accommodated by greater or lesser, respectively temperature differences, as will be apparent to one of ordinary skill in the art from this description.

Once the core 30 and sleeve 50 are combined as described above to form the piston 12, gas only flows through the passages formed. No gas flows between the inwardly facing surface of the sleeve and the outwardly facing surface of the core except where metering, manifold or reservoir grooves are formed. This preclusion of gas flow is due to the extremely tight fit between the core and sleeve.

In an alternative embodiment of the present invention, shown in FIGS. 8, 9, 10, and 11 a thin-walled cylindrical sleeve 200 has a radially inwardly facing surface 202 defining a cylindrical sleeve passage 204. A cylindrical core 210 has a radially outwardly facing surface 212 and a radially inwardly facing surface 214 defining a cylindrical core passage 216.

Radial core passages 218–225 extend through the core sidewall 217 from the inwardly facing surface 214 to the outwardly facing surface 212. Two circumferential metering grooves 240 and 242, which are similar in dimension and function to the metering grooves of the preferred embodiment, are aligned in fluid communication with the radial core passages 218–225. Four longitudinal manifold grooves 227–230 extend between the circumferential metering grooves 240 and 242 and the high pressure end of the cylinder wall to function similarly to the longitudinal grooves of the preferred embodiment by providing a low or no resistance flow path.

Figure 11:
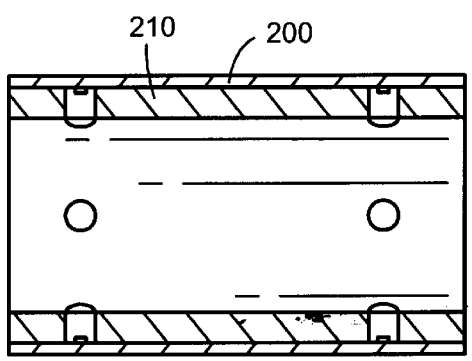
FIG. 11 is a side view in section illustrating an alternative embodiment of the present invention.

The core 210 is pushed into the sleeve 200 in a manner similar to the method of constructing the preferred embodiment until the structure shown in FIG. 11 is formed. The combined structure forms a cylinder wall for a free piston machine, such as a free piston compressor. A piston can be slidingly mounted within the core passage 216, and the radial passages 218–225 form a gas bearing for the piston during operation. The sleeve 200 in the alternative embodiment serves only to cover the grooves formed in the core 210.

The embodiment shown in FIGS. 8–11 could be used in a free piston compressor. Such a compressor has no need for a reservoir, because lubricating gas is drawn from the high pressure chamber. The longitudinal grooves 227–230 extend from the high pressure chamber to the circumferential metering grooves 240 and 242, which empty gas into the radial passages 218–225.

The preferred embodiment shows a substantial number of radial passages used as a gas bearing. A minimum of three radial passages is required to form an effective gas bearing, but in the preferred embodiment more are used.

It is not necessary to form a gas bearing between the core and displacer rod. For example, in free piston compressors, there is no displacer rod that must be lubricated.

In the preferred embodiment, the grooves and passages formed create a gas bearing during operation. As will become apparent to a person of ordinary skill in the art, the same method and structure could be adapted to form one or more free piston centering passages and/or grooves.

Figure 12:
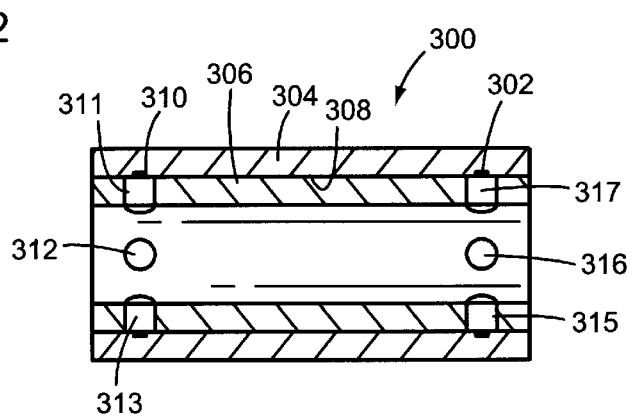
FIG. 12 is a side view in section illustrating an alternative embodiment of the present invention.

In an alternative embodiment shown in FIG. 12, a cylinder 300 is shown having an outer sleeve 304 and an inner core 306. The outer sleeve 304 has circumferential metering grooves 302 and 310 formed in its radially inwardly facing surface 308. The inner core 306 mounts within the sleeve 304 with an interference fit. The inner core 306 has radial ports 311–314 (314 not visible in FIG. 12) and radial ports 315–318 (318 not visible in FIG. 12). This embodiment illustrates the ability to form the circumferential metering grooves on the inwardly facing surface of a structure.

While certain preferred embodiments of the present invention have been disclosed in detail, it is to be understood that various modifications may be adopted without departing from the spirit of the invention or scope of the following claims.

What is claimed is:

1. An improved piston for a free piston machine in which the piston is slidably mounted in a cylinder formed in a housing and a gas bearing is formed in a gap between the piston and the cylinder, the improved piston comprising:

(a) a first cylindrical body having a radially inwardly facing surface and a radially outwardly facing surface;

(b) a second cylindrical body aligned coaxially with the first cylindrical body and having a radially inwardly facing surface and a radially outwardly facing surface;

(c) at least one fluid metering groove formed on one of the radially facing surfaces of the first cylindrical body, wherein one of the radially facing surfaces of the second cylindrical body sealingly abuts against the radially facing surface of the first cylindrical body that has said fluid metering groove formed thereon, a portion of said abutting surface of the second cylindrical body bridging over and covering the fluid metering groove defining a fluid flow path that resists the flow of fluid therethrough; and (d) at least three circumferentially spaced radial passages extending through one of the cylindrical bodies between the one cylindrical body's radially inwardly facing surface and the one cylindrical body's radially outwardly facing surface, said radial passages disposed in fluid communication with the fluid flow path and the gap between the piston and the cylinder.

2. An improved piston in accordance with claim 1, wherein the fluid metering groove is formed on the radially inwardly facing surface of the first cylindrical body, and the radially outwardly facing surface of the second cylindrical body sealingly abuts the radially inwardly facing surface of the first cylindrical body.

3. An improved piston for a free piston machine in which the piston is slidably mounted in a cylinder formed in a housing and a gas bearing is formed in a gap between the piston and the cylinder, the improved piston comprising:

(a) a cylindrical core having a sidewall with a radially outwardly facing surface and at least one fluid metering groove formed thereon;

(b) a cylindrical sleeve aligned coaxially with the core, the sleeve having a sidewall including a radially inwardly facing surface sealingly abutting against the outwardly facing surface of the core, said inwardly facing sleeve surface bridging over and covering the fluid metering groove, said fluid metering groove defining a fluid flow path that resists the flow of fluid therethrough; and (c) at least three circumferentially spaced radial sleeve passages extending through the sleeve sidewall between the inwardly facing surface of the sleeve and a radially outwardly facing surface of the sleeve, said radial sleeve passages disposed in fluid communication with the fluid flow path and the gap between the piston and the cylinder.

4. An apparatus in accordance with claim 3, further comprising a cylindrical core passage extending longitudinally through the core defining a radially inwardly facing surface, and at least three radial passages extending radially through the core sidewall and disposed in fluid communication with the fluid flow path and the cylindrical core passage.

5. An apparatus in accordance with claim 3, wherein said at least one fluid metering groove further comprises at least one circumferential metering groove formed on the radially outwardly facing surface of the core, said circumferential metering groove being in fluid communication with the radial sleeve passages.

6. An apparatus in accordance with claim 5, further comprising at least one longitudinal manifold groove formed on the radially outwardly facing surface of the core, said longitudinal manifold groove being in fluid communication with the circumferential metering groove.

7. An apparatus in accordance with claim 5, further comprising:

(a) a circumferential reservoir groove formed in the radially outwardly facing surface of the core;

(b) a source fluid passage formed in the core sidewall, said source fluid passage extending longitudinally from the circumferential reservoir groove to a core end; and (c) a one-way valve formed along the source fluid passage to prevent fluid flow from the reservoir toward the core end.

8. An apparatus in accordance with claim 3, further comprising:

(a) a cylindrical core passage extending longitudinally through the core and defining a radially inwardly facing surface;

(b) four radial core passages substantially equally spaced circumferentially around the core sidewall and extending radially through the core sidewall, said core passages being disposed in fluid communication with the cylindrical core passage;

(c) four radial sleeve passages substantially equally spaced circumferentially around the sleeve sidewall and extending radially through the sleeve sidewall;

(d) a first circumferential metering groove formed on the radially outwardly facing surface of the core, said circumferential metering groove being in fluid communication with the radial core passages;

(e) a second circumferential metering groove formed on the radially outwardly facing surface of the core, said circumferential metering groove being in fluid communication with the radial sleeve passages;

(f) a circumferential reservoir groove formed in the radially outwardly facing surface of the core;

(g) a source fluid passage formed in the core sidewall, said source fluid passage extending longitudinally from the circumferential reservoir to a core end;

(h) a one-way valve formed along the source fluid passage to prevent fluid flow from the reservoir groove toward the core end; and (i) a longitudinal manifold groove formed in the radially outwardly facing surface of the core, said longitudinal manifold groove being in fluid communication with the circumferential metering grooves and the circumferential reservoir groove.

9. A method of forming an improved piston for a free piston machine in which the piston is slidingly mounted in a cylinder and a gas bearing is formed in a gap between the piston and the cylinder, the method comprising:

(a) coaxially aligning a cylindrical core, the core having a radially outwardly facing surface and at least one groove formed thereon, with a cylindrical sleeve, the sleeve having a sidewall including a radially inwardly facing surface and at least three circumferentially spaced radial passages extending through the sleeve sidewall between the inwardly facing surface of the sleeve and a radially outwardly facing surface of the sleeve; and (b) sealingly abutting the outwardly facing core surface against the inwardly facing sleeve surface, said inwardly facing sleeve surface bridging over and covering the groove, defining a fluid flow path within the covered groove that resists the flow of fluid through the fluid flow path, whereby the radial passages are disposed in fluid communication with the fluid flow path within the groove.

10. The method in accordance with claim 9, further comprising changing the relative temperatures of the core and sleeve prior to the step of sealingly abutting.

11. An improved cylinder for a free piston machine in which the piston is slidingly mounted in the cylinder and a gas bearing is formed in a gap between the piston and the cylinder, the improved cylinder comprising:

(a) a cylindrical core having a sidewall with a radially outwardly facing surface and at least one fluid metering groove formed thereon, and a cylindrical core passage extending longitudinally through the core defining a radially inwardly facing surface;

(b) a cylindrical sleeve aligned coaxially with the core, the sleeve having a sidewall including a radially inwardly facing surface sealingly abutting against the outwardly facing surface of the core, said inwardly facing sleeve surface bridging over and covering the fluid metering groove, said fluid metering groove defining a fluid flow path within the groove that resists the flow of fluid through the fluid flow path; and (c) at least three circumferentially spaced radial core passages extending through the core sidewall between the inwardly facing surface of the core and the radially outwardly facing surface of the core, said radial core passages disposed in fluid communication with the fluid flow path and the gap between the piston and the cylindrical housing.

* * * * *